United States Patent
Lansler et al.

(10) Patent No.: US 10,164,954 B2
(45) Date of Patent: Dec. 25, 2018

(54) METHOD TO MANAGE A ONE TIME PASSWORD KEY

(71) Applicant: GEMALTO SA, Meudon (FR)

(72) Inventors: Martin Lansler, Gemenos (FR);
Sébastien Petit, Gemenos (FR);
Guillaume Pierquin, Gemenos (FR)

(73) Assignee: GEMALTO SA, Meudon (FR)

( * ) Notice: Subject to any disclaimer, the term of this patent is extended or adjusted under 35 U.S.C. 154(b) by 261 days.

(21) Appl. No.: 15/128,185

(22) PCT Filed: Mar. 25, 2015

(86) PCT No.: PCT/EP2015/056354
§ 371 (c)(1),
(2) Date: Sep. 22, 2016

(87) PCT Pub. No.: WO2015/144747
PCT Pub. Date: Oct. 1, 2015

(65) Prior Publication Data
US 2017/0104739 A1    Apr. 13, 2017

(30) Foreign Application Priority Data
Mar. 25, 2014    (EP) ..................................... 14305425

(51) Int. Cl.
*H04L 9/14*    (2006.01)
*H04L 29/06*    (2006.01)
(Continued)

(52) U.S. Cl.
CPC .......... *H04L 63/067* (2013.01); *G06F 21/602* (2013.01); *H04L 9/0863* (2013.01);
(Continued)

(58) Field of Classification Search
CPC .................................. H04L 9/14; H04L 9/32
See application file for complete search history.

(56) References Cited

U.S. PATENT DOCUMENTS 6,067,621 A    5/2000    Yu et al.
2007/0250923 A1    10/2007    M'Raihi
(Continued)

FOREIGN PATENT DOCUMENTS

WO    WO 2011/029719 A1    3/2011
WO    WO 2013/039952 A1    3/2013

OTHER PUBLICATIONS

International Search Report (PCT/ISA/210) dated Jul. 22, 2015, by the European Patent Office as the International Searching Authority for International Application No. PCT/EP2015/056354.
(Continued)

*Primary Examiner* — Izunna Okeke
(74) *Attorney, Agent, or Firm* — Buchanan Ingersoll & Rooney PC

(57) ABSTRACT

The present invention relates to a method to manage a One Time Password key, referenced OTP key, used in an OTP algorithm in a user device having access to an unsafe storage including the steps of retrieving a Personal Identification Number, named PIN, of a user of the user device, deriving a symmetric key from the PIN, encrypting the OTP key using the derived symmetric key, storing the encrypted OTP key in the unsafe storage, decrypting the OTP key using the derived symmetric key, and generating a next OTP key using an incremental parameter, wherein the start value of the incremental parameter of the OTP key generation is random.

6 Claims, 2 Drawing Sheets

(51) Int. Cl.
*H04L 9/08* (2006.01)
*H04L 9/12* (2006.01)
*H04L 9/32* (2006.01)
*G06F 21/60* (2013.01)

(52) U.S. Cl.
CPC .............. *H04L 9/0869* (2013.01); *H04L 9/12* (2013.01); *H04L 9/3226* (2013.01); *H04L 9/3228* (2013.01); *H04L 63/0838* (2013.01)

(56) References Cited

U.S. PATENT DOCUMENTS

2011/0113245 A1   5/2011   Varadarajan
2013/0227661 A1*  8/2013   Gupta .................... G06F 21/31
                                                          726/6

OTHER PUBLICATIONS

Written Opinion (PCT/ISA/237) dated Jul. 22, 2015, by the European Patent Office as the International Searching Authority for International Application No. PCT/EP2015/056354.
Mansoor Ahmed Khan et al., "Improved Nonce Construction Scheme for AES CCMP to Evade Initial Counter Prediction", Ninth ACIS International Conference on Software Engineering, Artificial Intelligence, Networking, and Parallel/Distributed Computing, Aug. 6, 2008, pp. 307-311, XP031315762.

* cited by examiner

METHOD TO MANAGE A ONE TIME PASSWORD KEY

FIELD OF THE INVENTION

The present invention relates to a method to manage a One Time Password key, referenced OTP key. More specifically, the invention relates to the management of such an OTP key used in an OTP algorithm in a user device having access to an unsafe storage including the steps of:
- retrieving a Personal Identification Number, named PIN, of an user of the user device,
- deriving a symmetric key from the PIN,
- encrypting the OTP key using the derived symmetric key,
- storing the encrypted OTP key in the unsafe storage.
- decrypting the OTP key using a symmetric key derived from a later retrieved PIN,
- generating a next OTP using an incremental parameter.

The invention also pertains to a user device implementing said method.

BACKGROUND OF THE INVENTION

OTP algorithms are based on the use of a secret key shared between a client, generally implemented in a user device to generate OTP, and a server, that will validate OTP. Each OTP generator has a different secret OTP key.

OTP algorithm must also be sequence or counter based and thus use an incremental parameter synchronized between the OTP generator, generally a client inside a user device, and the OTP validator, generally a server.

The OTP is thus generally produced using a synchronized incremental parameter, generally of the counter type. It has to be noted here that the incremental parameter can be incremented or decremented depending on the implementation without departing from the scope of the invention, the essential feature being the synchronization of the counter on both sides using the OTP.

Advantageously, a throttling parameter TH is also used for the server to refuse connections from a user after TH unsuccessful authentication attempts.

Generally, to protect a key used in OTP algorithms such as CAP and OATH in unsafe environments, such as encountered in mobile device, a common protection mechanism is to derive a symmetric key, KEK, from the user PIN.

In this case KEK=KDF(PIN), where KDF is a Key Derivation Function.

The OTP key, TOK, is then encrypted with the KEK and stored in a potentially unsafe storage:

(TOK)KEK=CIPHER(KEK, TOK), where CIPHER is a symmetric cipher such as 3DES or AES.

Then the use of the PIN is distinct from the one used in smart cards or other secure tokens. The security model for software-based OTP on mobile devices, like mobile phones or tablets with or without secure element, is based on the use of the PIN to derive a key used to encrypt the OTP key.

Indeed the PIN is not used to grant access to OTP services but the OTP key is instead encrypted with a key derived from user's PIN. If a wrong PIN is used the decryption process is performed, generating a bad OTP key.

As normal used PIN lengths are typically 4 decimal digits, an attacker can brute-force decrypt the TOK using all the possible 10 000 PIN combinations (0000-9999). As the TOK is carefully created to ensure it is completely random and has no stop conditions like parity bits or others, the attacker will have 10 000 possible valid TOK values but with no stop condition, i.e. no way to distinguish the valid TOK from the invalid ones.

If someone gets access to the encrypted OTP key it is easy to list all the possible plaintext keys as the number of different PIN is very limited, typically PIN are 4-digits long.

Therefore the security of the solution relies on one single principle: it should be not possible for an attacker to distinguish between the good plaintext key and the others generated by wrong PINs. Only the server can distinguish it and implements a try counter to mitigate brute force.

However, this principle is valid until an attacker can find a "stop condition" allowing the distinction between the good key and the others. IIf the attacker at this point gains access to a valid OTP and also can guess a small range of either the event counter C or the number of time steps T, an attack can be made using the calculation of possible OTP_P:

$$OTP\_P=OTP\_algo(TOK, C|T), \text{ where OTP\_algo is the used OTP algorithm.}$$

The calculation is done over all possible TOK values, ranges of C or T and stopped when OTP_P is equal to the known valid OTP. If the possible range of C|T is small, the attack will quickly yield exactly one possible TOK.

Knowing a genuine OTP value, i.e. generated with the correct PIN, is a "stop condition". To forge a brute force, the attacker needs to have the encrypted OTP key, the genuine OTP and try to guess the couple (PIN, counter). Counter is an input to compute the OTP. Any old genuine OTP can be used.

Thus, if an OTP key encrypted with the PIN-derived key is available, a valid OTP is available and a counter or current time range is known, a brute-force attacker will be able to access the OTP key.

Further alternative and advantageous solutions would, accordingly, be desirable in the art in order to protect PIN encrypted key.

SUMMARY OF THE INVENTION

The present invention aims at avoiding, or at least making more difficult the above-mentioned malicious attacks.

The present invention is defined, in its broadest sense, as a method to manage a One Time Password key, referenced OTP key, characterized in that the start value of the incremental parameter of the OTP generation is random.

With this method, brute-force attack on a CAP or OATH key that is encrypted by a PIN derived key KEK are prevented even if a valid OTP is known and can be used as a stop condition.

Therefore, the method according to the present invention allows reducing the risks of malicious attacks. At least, the attacks are more complex to carry out for a malicious attacker.

According to a first embodiment of the invention, the incremental parameter being intended to take values within an interval, the start value of the incremental parameter of the OTP generation is a generated random value chosen in this interval.

This embodiment is particularly adapted with algorithm having a counter that may wrap. In such a case, even the highest value of incremental parameter can be chosen as the counter will wrap when arriving at the end of the interval. The start value is thus randomly chosen within the whole interval of values possible for the incremental parameter and the protection conferred by the invention is optimal.

According to specific embodiment, the number of possible values for the incremental parameter being limited and the algorithm being such that the counter is not wrap, the start value of the incremental parameter of the OTP generation is a random value chosen in a limited interval of possible values for incremental parameter.

This embodiment enables to apply the principle of the invention while partially controlling the choice of the start value in order for it not to be chosen anywhere in the set of possible values.

In a specific embodiment, in the case the counter is incremented, the limited interval is the one including lowest bits This embodiment enables to implement the invention even in case where the counter cannot wrap. This embodiment enables to let enough room to increment the counter by choosing the start value at the lower bits extremity.

According to another embodiment, the OTP algorithm being time based, the start value of the incremental parameter of the OTP generation is a random start time lying in the range from time 0 to current time such that the number of calculated time step effectively becomes random.

This embodiment enables to apply the invention to the case a time based incremental parameter is used.

A large counter space size is interesting because it allows to significantly improving the complexity of the brute force attack if its value can't be guess easily as it is the case with a random start value. Unfortunately on software mobile platform the value has generally to be stored along the encrypted key and so can be attacked in the same time and with same effort as for the key itself. Counter is monotonically incremented for each OTP, which doesn't provide backward secrecy.

In a specific embodiment, the invention thus proposes that the incremental parameter of the OTP generation is derived from a one-way internal state updated after each OTP generation.

The counter itself is not stored in the device memory. As a one-way internal state cannot be reversed, knowing an internal state will not allow guessing or computing a previous one. Besides, knowing the counter value, the internal state cannot be guessed or computed.

Counters are then no more incremented but uniformly distributed in their space and the current state doesn't allow guessing previous values needed to mount the attack.

Advantageously, the derivation of the incremental parameter is a reduction of the internal state to a predetermined interval of bytes of the internal state.

Depending on the requirements of the OTP generation algorithm, this embodiment concerns the selection of a given number of bytes. For example the lowest bytes of the internal state are selected to produce a counter value as required by the OTP generation algorithm.

According to a specific embodiment, the derivation of the incremental parameter is a mix of a part of the internal state and of a monotonically incremented value.

Such a composite incremental parameter enables to improve non collision properties.

The invention thus blocks the brute force attack on PIN by making the counter value unavailable to the attacker in case of forensic attacks and introduces a backward secrecy property.

The present invention also relates to a user device having access to an unsafe storage and implementing the method to manage a One Time Password key according to the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
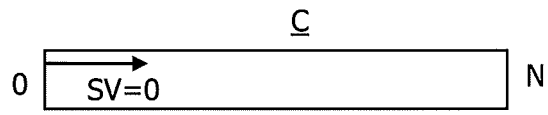
FIG. 1 schematically shows the functioning of a counter of the prior art.

FIG. 1 schematically shows the functioning of a counter C of the prior art. In general, counters can take a limited number of values determined by the number of bits on which they are stored.

In FIG. 1, the counter C is represented as a rectangle representing the values between 0 and N. According to the prior art, the counter C starts with 0 as start value SV. The counter is then incremented from 0.

Figure 2:
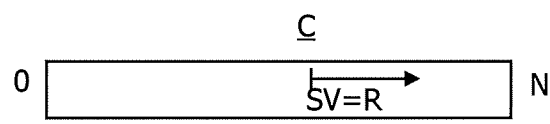
FIG. 2 schematically shows the effect of the invention on a counter according to an embodiment.

FIG. 2 shows the effect of the invention on a counter C according to a first embodiment. A random number R is generated between 0 and N and used as start value SV. The counter C is incremented from this random number R=SV.

Figure 3:
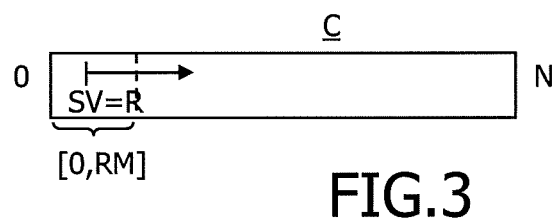
FIG. 3 schematically shows the effect of the invention on a counter according to a specific embodiment.

FIG. 3 illustrates a specific embodiment where only smallest range of lower bits are randomized to determine a random number R that will serve as a start value SV. The random number R is thus chosen in the interval of the smallest bits [0,RM]. This embodiment is adapted where the counter cannot wrap and the counter is incremented. In the worse case, RM is chosen in this embodiment. It let all the values above RM for the generation of the OTP key. Of course the other extremity of the interval [0;N] will be chosen in case the counter is decremented.

It is here noted that the same approach as for incrementing values can be used to calculate RM in order that the counter then is calculated as C=MAX_COUNTER_VALUE−RM, thus being decremented. The random number R is thus chosen in the interval of the smallest bits [0,RM]

For example, a decrementing counter C could be used for a counter with 8-bytes. The highest bit are reserved as a random RM is selected in range 0 . . . 2^63. Then the counter is calculated as: C=2^64−1−RM.

For $RM=0 => C=2^{64}-1$

For $RM=2^{63} => C=2^{64}-1-2^{63} \sim = 9*10^{18}$

Figure 4:
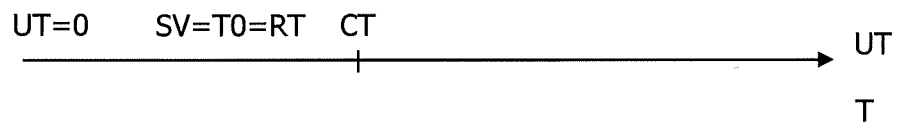
FIG. 4 schematically shows the effect of the invention on a counter according to another embodiment.

FIG. 4 shows schematically an embodiment with a time based counter T. At a time CT of a real time UT, real time being for example current Unix time, determined inside a device in which the invention is implemented, a start time T0 has to be determined. According to the invention, a random start time RT is determined as T0 between time 0 and current time CT.

The used terminology is the one defined in the TOTP RFC 6238. T is the number of time steps (i.e. 30 sec) that have passed since the start time T0 and the current time. To avoid confusion of T with the current time CT, the current time is referenced CT. The counter time step T is then determined from the start time T0=RT and the current time CT based on the algorithm.

By providing a random offset in time, the invention enables to render attacks more difficult.

The use of either a random start value for a counter or random start time ensure that the range of possible CIT cannot easily be guessed by an attacker. If the possible range is sufficiently large, a brute force attack will become infeasible. The possible range depends on the OTP algorithm.

For OATH OTP algorithm, the counter is 8-bytes. If this starts from 0, an attacker can search a small range starting from zero to X, where X is the estimated number of OTPs computed already. If a random value is used as start value for all except the highest bit, the number of possible counters to search will on average be $2^{62}$. For each counter 10 000 possible TOK values need to be tried, requiring a total of roughly $2^{75}$ OTP calculations to brute force attack. The unused highest bit leaves roughly $9*10^{18}$ still unused counter values.

For the time based counter, below is given a detailed example based on the TOTP RFC:

X, is the time step size in seconds. This is typically 30 seconds, but is configurable.

T0, is the start time from which the time steps are counted. This is in the interval of Unix time UT=0 (epoch time) to current Unix time CT T, is the number of time steps as counted from T0 to the current time CT.

$$T=\text{floor}((CT-T0)/X)$$

From the RFC, for example, in prior art, with T0=0 and Time Step X=30, T=1 if the current Unix time UT is 59 seconds, and T=2 if the current Unix time UT is 60 seconds.

In prior art, the time-based OTP is then calculated as:

OTP=OTP_alg(*TOK, T*) where T is the incremental parameter in the meaning of the invention.

In the invention, the start time T0 is chosen randomly in the range from 0 to current Unix time CT yielding unpredictable T values as far as T0 is not known.

In an exemplary implementation, the server side implementing the OTP algorithm will select the random value to use as the start value. This start value is then communicated to the client/device side. It is advantageously done over-the-air as part of the provisioning protocol. It thus uses proprietary secure protocol for delivering the OTP key to the device. For hardware based devices such as a token or reader, this would typically be done in the personalization center when the device is created.

Regardless of the transmission mechanism, both client and server must accept such a randomly chosen value and have the same start value for the counter.

To successfully perform a brute force attack on the PIN, the attacker needs to have: the OTP key encrypted with the PIN-derived key, a valid OTP value and the counter used to compute this OTP. Even if the invention renders the access to the counter more complex, when the encrypted OTP key and counter are stored both in the mobile in persistent memory, the value of the counter can indeed be retrieved with the same attack complexity. As counters are incremented monotonically, it is easy to guess the value used to compute the OTP from the current state. Only few values need to be tried.

The counter of the invention can be further improved by using a one-way internal state to derive counters.

Figure 5:
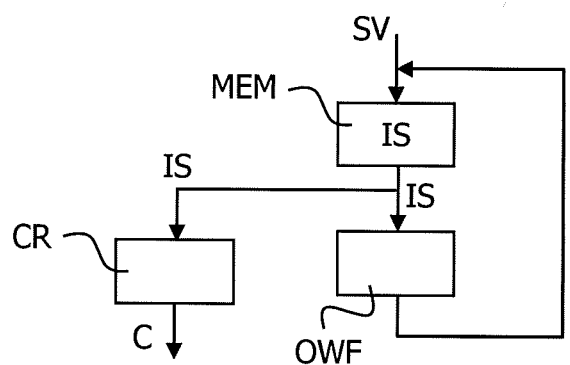
FIG. 5 shows schematically the obtention of an incremental parameter according to a specific embodiment of the invention.

FIG. 5 describes the construction of such an incremental parameter. A random start value SV is presented as input only once. This start value SV is shared with the other entity implicated in the authentication process using the OTP, typically a server. It is here required that the size of the start value SV is chosen to be compliant with a one-way function OWF that will be used to calculate successive internal states IS. The start value and then the successive internal states IS are stored in a memory MEM. This is the single value which is stored in persistent memory, and thus subject to attacks.

Each time an OTP is to be calculated, the internal state IS as stored is extracted from memory MEM and provided at the input of a one-way function OWF. This function OWF can be a digest function of the kind of Secure Crypto digest like SHA256. This kind of functions can generally take any size of data as input. In practice the size is of the length of the output as internal state IS will be updated by the output at each round.

The internal state IS is also provided to a counter reduction module CR. This module converts the long internal state IS into a value having a length compliant with the OTP algorithm. For example, the 8 lowest bytes of the internal state IS are taken to form the counter value C used as input at an OATH OTP algorithm. The output of the counter reduction module CR is the counter value C as input at the OTP algorithm for next OTP computation.

Each time an OTP is calculated, the mechanism as described on FIG. 5 is used to output a new counter, incremental parameter, and to update the internal state in persistent memory.

If an attacker gets a valid OTP and the current internal state in order to forge a brute force against the PIN, the computation of the previous state will not be possible as the one-way function cannot be reversed. The attacker thus cannot know the counter value associated to the OTP.

The counter value C, for example the lowest 8-bytes of internal state IS, does not allow computing the previous or next internal state.

The complexity of the attack is then much higher as the full space of counter needs to be exhausted for the brute force. In practice it blocks the attack as during exhausting all the counter values a lot of false positive (PIN,counter) couple will be generated with wrong PINs, the real good PIN cannot be guessed anymore.

Indeed the size of brute force search is not only a computational issue for an attacker. The problem is that due to this space of search a lot of couples (PIN,counter) will match the correct OTP used as stop condition. In fact, depending on the size of counter relative to the size of OTP, all PIN value will have a counter value that will generate the expected OTP. Even more, to be precise, several counters will generate the correct OTP if sizes are correctly chosen.

So with one OTP, the attacker is still unable to get the correct PIN. The attack complexity is then increased as several OTP will be required to setup a successful attack.

Exact number of OTP required to distinguish the correct PIN with a certain probability, is a function of length of the PIN, length of OTP and length of the counter.

Counter are uniformly distributed in their respective space with a low probability of collision, for example it is the case for the OATH counters which are 64-bit long. In case the implementation still needs a proven non collision property the counter reduction step can be modified to mix a random part and a classic monotonically incremented value. The monotonically incremented part insures the absence of collision.

The mechanism needs to be implemented on device as well as authentication server. On server, it is still possible to implement an authentication window like on current implementations.

Figure 6:
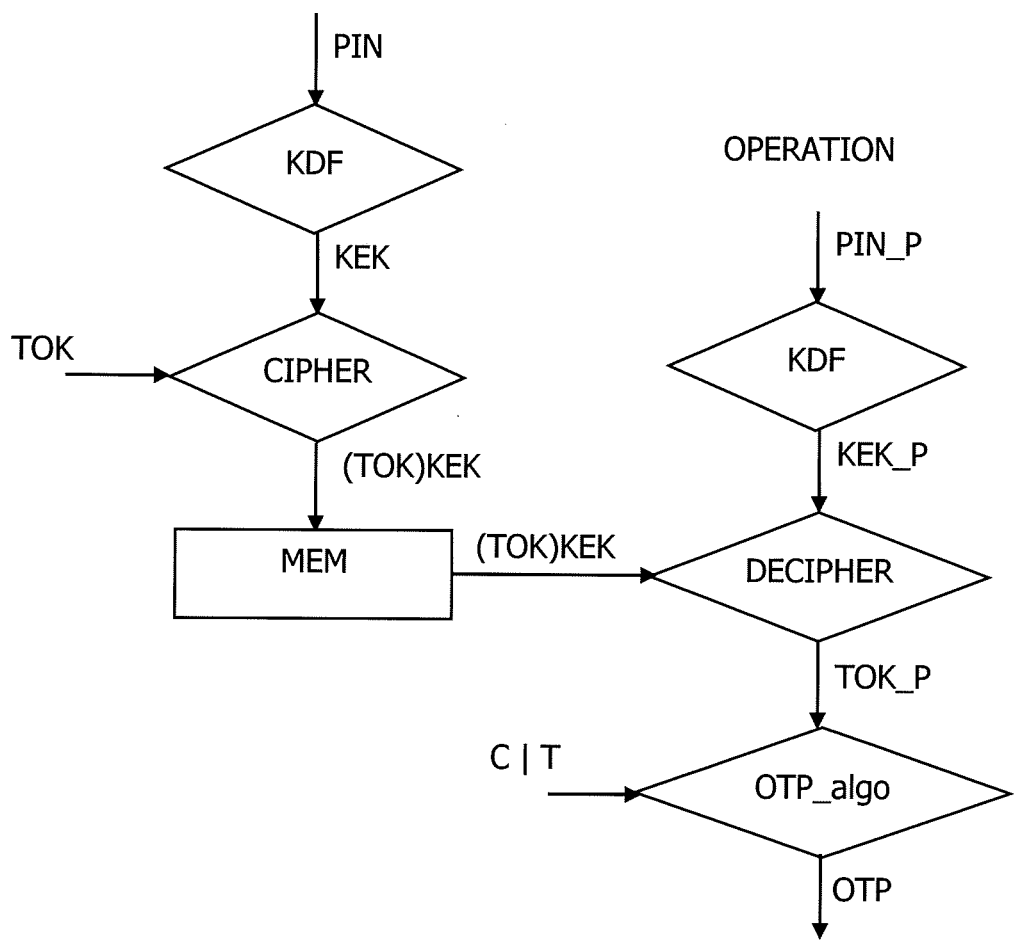
FIG. 6 schematically shows a method to manage an OTP key according to the invention.

FIG. 6 schematically shows the method to manage an OTP key TOK according to the invention.

As preliminary steps, a correct PIN is provided to a key derivation function outputting a symmetric key encryption key KEK. This key encryption key KEK is used by an encryption module CIPHER to encrypt the OTP key TOK to output an encrypted key (TOK)KEK. This encrypted key (TOK)KEK is stored in a memory MEM.

Once on field, when an OTP is required, the user is prompted to enter an acquired PIN_P. This PIN_P is provided to the key derivation function KDF to produce a current key encryption key KEK_P to be used for the OTP process. This key KEK is used in a decryption module DECIPHER to decrypt the encrypted OTP key (TOK)KEK extracted from memory MEM.

A recalculated OTP key TOK_P is thus obtained. This key TOK_P is the key used by the OTP algorithm OTP_algo to calculate the OTP with the incremental parameter C or T.

The above detailed description specifies specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to manage a One Time Password key, referenced OTP key, used in an OTP algorithm in a user device having access to an unsafe storage including the preliminary steps of:
retrieving a Personal Identification Number, named PIN, of a user of the user device,
deriving a symmetric key from the PIN,
encrypting the OTP key using the derived symmetric key,
storing the encrypted OTP key in the unsafe storage
the method further comprising the following steps, when the calculation of an OTP is required:
retrieving a PIN of a user of the user device,
decrypting the stored OTP key using the derived symmetric key, and
using said decrypted OTP key and an incremental parameter to generate a next OTP,
wherein the incremental parameter has values within an interval in which the number of possible values for the incremental parameter is limited and the algorithm is such that a counter is not wrapped, and the start value of the incremental parameter of the OTP generation is a generated random value chosen in a limited interval of possible values for the incremental parameter,
and wherein, in the case the counter is incremented, the limited interval is one including lowest bits.

2. The method according to claim 1, wherein, the OTP algorithm is time based, the start value of the incremental parameter of the OTP generation is a random start time lying in the range from time 0 to current time such that the number of calculated time steps effectively becomes random.

3. The method according to claim 1, wherein the incremental parameter of the OTP generation is derived from a one-way internal state updated after each OTP generation.

4. The method according to claim 3, wherein the derivation of the incremental parameter is a reduction of the internal state to a predetermined interval of bytes of the internal state.

5. The method according to claim 3, wherein the derivation of the incremental parameter is a mix of a part of the internal state and of a monotonically incremented value.

6. A user device having access to an unsafe storage and implementing the method of claim 1.

* * * * *